F. J. RICHARDS.
COMBINED BURNER AND HEATER.
APPLICATION FILED APR. 20, 1916.

1,190,461.  Patented July 11, 1916.

Witness:
A. V. Doyle

Inventor,
Francis J. Richards
By Victor J. Evans,
Attorney

UNITED STATES PATENT OFFICE.

FRANCIS J. RICHARDS, OF BROOKLYN, NEW YORK.

COMBINED BURNER AND HEATER.

1,190,461. Specification of Letters Patent. Patented July 11, 1916.

Application filed April 20, 1916. Serial No. 92,449.

*To all whom it may concern:*

Be it known that I, FRANCIS J. RICHARDS, a citizen of the United States, residing at Brooklyn, in the county of Kings and State of New York, have invented new and useful Improvements in Combined Burners and Heaters, of which the following is a specification.

This invention relates to a lighting and heating attachment for gas brackets or the like and has for its principal object the provision of a device of this character whereby gas may be burned for heating purposes or for lighting purposes at the discretion of the user or operated simultaneously or at the same time.

Another object of the invention resides in the provision of a combined lighting and heating attachment which will consist of a heating burner provided with a peculiarly formed mixing chamber and means for inducing air and gas to said chamber and subsequently causing the same to be scattered or distributed and thoroughly commingled or mixed before passing to the burner crown or cap.

Another object of the invention is to provide a device of this character in which means are provided for properly mixing the air with the gas so that the flame will be uniform throughout and positively free of objectionable carbon accumulations.

With the above and other objects in view which will appear as the nature of the invention is better understood, the same consists in the improved construction and novel arrangements of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

Figure 1:
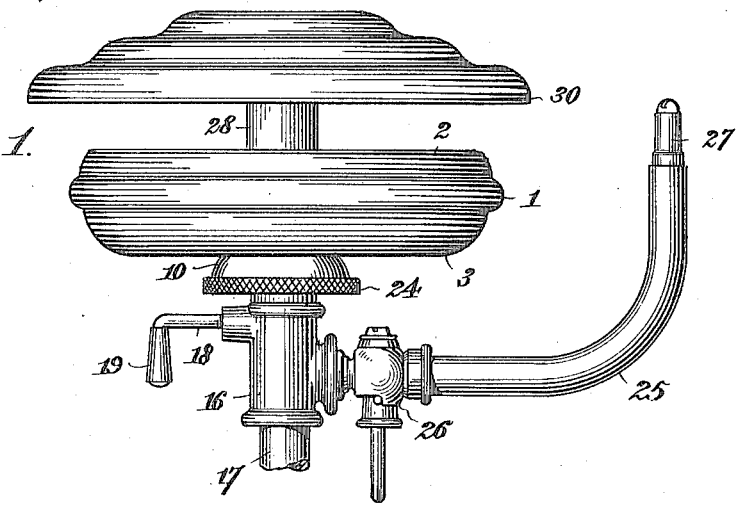
Figure 2:
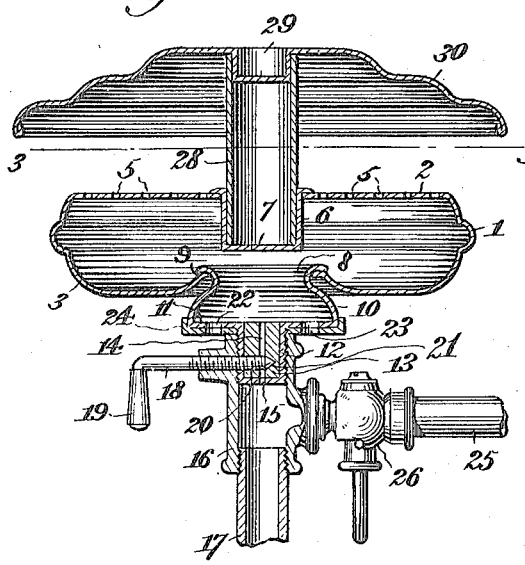
Figure 3:
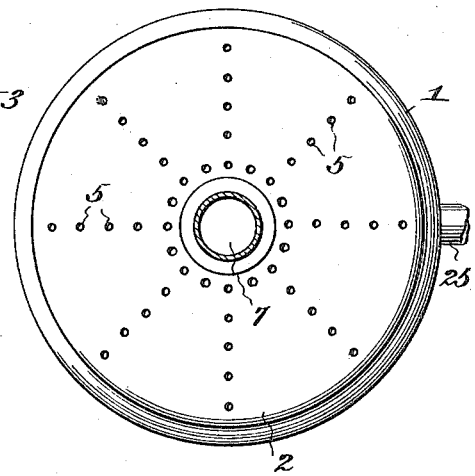

In the drawings: Figure 1 is a side view of the combined burner and lighting device. Fig. 2 is a section on an enlarged scale through a portion of the burner. Fig. 3, is a sectional plan view on the line 3—3 of Fig. 2.

The device consists of a heating burner 1, consisting of a crown or cap 2, and a base member 3, of substantially bowl shaped construction, the marginal edge 4, of which being rolled into the marginal sides of the cap or crown 2, as shown. The cap or crown is provided with suitably arranged burner openings 5, and at the center the crown is upstruck to form a depending socket 6, having a base wall 7, forming a baffle which is horizontally disposed and arranged preferably below the horizontal plane of the main body of the crown or cap 2, and as illustrated, said baffle is disposed in the same vertical line with the intake end 8, of the burner. At said intake end the burner is connected by crimping or otherwise securing as at 9, with a mixing dome 10, having a central relatively broad crown 11, provided with a depending upstruck nipple 12, in which a plug 13, is secured in any suitable well known manner. This plug is provided with a reduced central passage 14, which extends in line with a passage 15, in the nipple as shown. The said nipple has connection with a T-coupling 16, with which is connected a gas supply pipe 17, representing a portion of a gas bracket or chandelier. Threadedly mounted in the T-coupling 16, is a valve stem 18, having a suitable lever 19. This stem intercepts the passage 14, in the plug 13, and the latter is provided with a passage 20, which receives the stem and as shown, said passage terminates in a seat 21, against which the valve stem may close and thereby entirely cut off the passage 14, to prevent the flow of gas to the burner 1. The crown wall 11, of the dome 10, is provided with passages 22, which are adapted to register with similar passages 23, in a rotary valve plate 24, the latter being disposed beneath the dome and it is operatively mounted upon the nipple 12, at a point above the T-coupling 16.

Extending from the T-coupling is a branch pipe 25, having a valve 26, therein. This pipe is extended upwardly at its outer end so as to be disposed at the side of the burner 1. It is provided with a suitable burner tip 27, whereby gas may be burned for illuminating purposes. In this manner it obviously follows that the valves hereinbefore referred to may be singly controlled so that gas may be burned either for illuminating or heating purposes at the desire of the operator. However, the construction also permits gas to be fed simultaneously to the illuminating burner and said heating burner.

The cap 2, is provided with a removable pipe section or tube 28, the lower end of which having detachable connection with the socket 6. The upper end of the pipe extends for some distance above the crown of the burner 1, and it has detachable connection with the depending projection or lug 29, on a protecting and distributing hood 30. This hood consequently extends entirely over the burner structure and it forms a protector to prevent the heated products from passing directly on to the ceiling above as will be understood. It further causes the heated air to be deflected in a downward direction around the burner.

The parts so far described are all relatively separable whereby the device may be arranged in a compact package for storage or shipment.

The mixing chamber defined by the crown 2, and the base member 3, is substantially of an increasing depth in an outward direction. This construction is preferred in view of the purpose of the baffle 7, which is designed for the purpose of obstructing the flow of gas as it enters the burner. The baffle serves to cause the gas to scatter in a lateral direction and as a consequence thereof, it immediately spreads into the larger portion of the chamber where it becomes thoroughly commingled with the air. This permits the gas to burn with a uniform blue flame and objectionable carbon accumulations are satisfactorily eliminated.

What is claimed as new is:—

1. A combined heating and lighting device comprising a heating burner provided with a perforated portion, a mixing chamber of an increasing depth in an outward direction, an air regulator at the base of the member, a valved fuel supply pipe leading to the chamber, the perforated portion of the burner having a depending socket at its center provided with a baffle forming wall disposed in the same longitudinal line with the fuel supply pipe, and a valved pipe section extending from said fuel supply pipe.

2. A combined heating and lighting device comprising, a heating burner having a wall provided with perforations, a depending socket member at the center of the perforated wall of the burner, a pipe section detachably fitting in the socket member, a dome detachably fitted in the opposite end of the pipe and overlying the perforated wall, the burner member having a mixing chamber, an air regulating valve opening to the mixing chamber, the socket member having a baffle disposed in axial alinement with the air regulating valve, and valved means for feeding fuel to the air regulating valve.

3. A combined heating and lighting device comprising, a heating burner having a wall provided with perforations, a depending socket member at the center of the perforated wall of the burner, a pipe section detachably fitting in the socket member, a dome detachably fitted in the opposite end of the pipe and overlying the perforated wall, the burner member having a mixing chamber, an air regulating valve opening to the mixing chamber, the socket member having a baffle disposed in axial alinement with the air regulating valve, and valved means for feeding fuel to the air regulating valve, and comprising, a plug carried by the regulator and provided with an aperture and a valve seat, a coupling attached to the air regulating valve and surrounding the plug, and a valve stem adjustable across the aperture in the plug and against said seat.

In testimony whereof I, affix my signature in presence of two witnesses.

FRANCIS J. RICHARDS.

Witnesses:
ANNA V. DOYLE,
CHRIS FEINLE, Jr.